No. 606,670. Patented July 5, 1898.
J. W. H. JAMES & T. R. JORDAN.
APPARATUS FOR TREATING AURIFEROUS OR OTHER ORES.
(Application filed Oct. 16, 1896.)
(No Model.) 2 Sheets—Sheet 1.
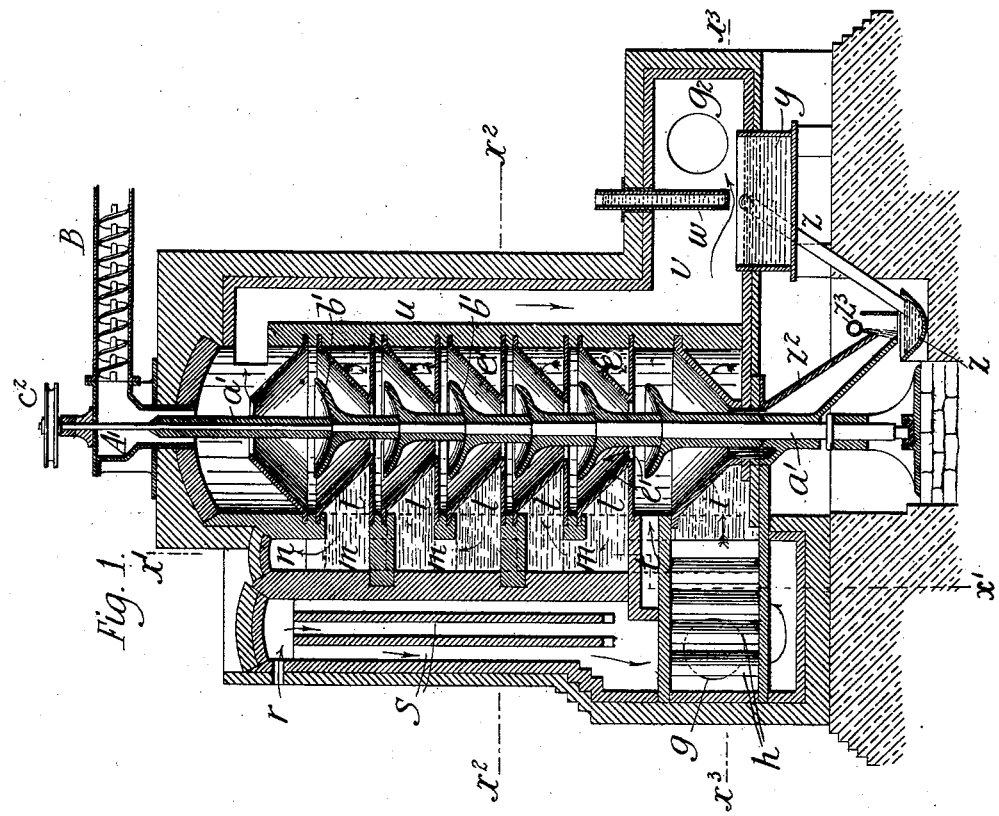
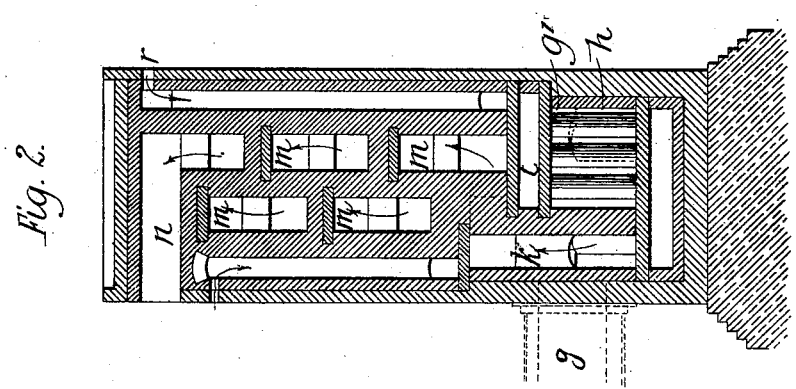
WITNESSES
INVENTORS
John William Henry James
Thomas Rowland Jordan
By their Attorneys
THE NORRIS PETERS CO., PHOTO-LITHO., WASHINGTON, D. C.

No. 606,670. Patented July 5, 1898.
J. W. H. JAMES & T. R. JORDAN.
APPARATUS FOR TREATING AURIFEROUS OR OTHER ORES.
(Application filed Oct. 16, 1896.)
(No Model.) 2 Sheets—Sheet 2.
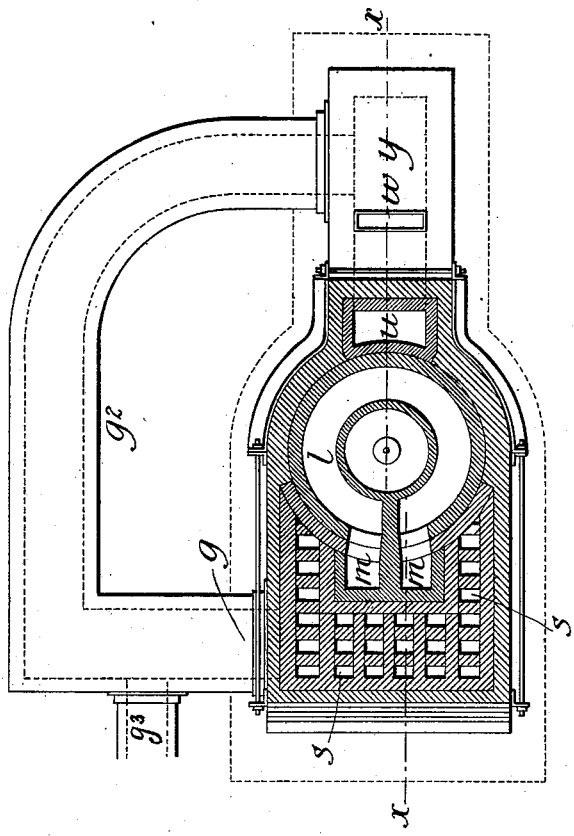
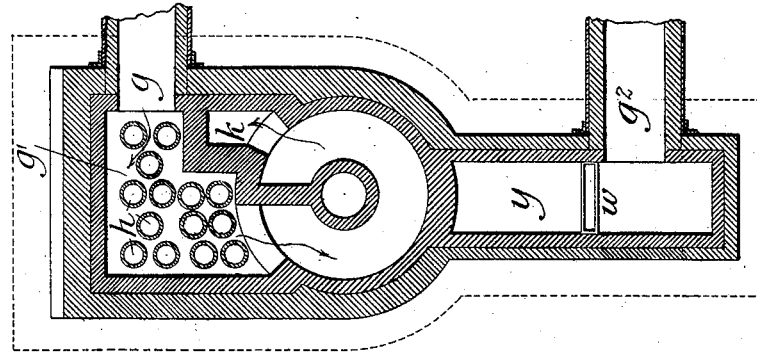
WITNESSES
INVENTORS
John William Henry James
Thomas Rowland Jordan
By their Attorneys.

UNITED STATES PATENT OFFICE.

JOHN WILLIAM HENRY JAMES AND THOMAS ROWLAND JORDAN, OF NEW YORK, N. Y., ASSIGNORS TO THE ANGLO AMERICAN REDUCTION COMPANY, OF WEST VIRGINIA.

APPARATUS FOR TREATING AURIFEROUS OR OTHER ORES.

SPECIFICATION forming part of Letters Patent No. 606,670, dated July 5, 1898.

Application filed October 16, 1896. Serial No. 609,074. (No model.)

*To all whom it may concern:*

Be it known that we, JOHN WILLIAM HENRY JAMES, civil engineer, and THOMAS ROWLAND JORDAN, mining engineer, of the city of New York, N. Y., have invented improved machinery, appliances, and plant forming a complete process for the treatment of auriferous or other ores and for the extraction of the precious metals therefrom; and we declare that the following is a clear and exact description of this invention, reference being had to the accompanying drawings, in which—

Figure 1 is a sectional elevation of the calcining or oxidizing furnace, taken through the line $x\,x$ of Fig. 3. Fig. 2 is a vertical section taken on the line $x'\,x'$. Fig. 3 is a cross-section taken on the line $x^2\,x^2$. Fig. 4 is a like section taken on line $x^3\,x^3$.

Our invention relates to the reduction and treatment of auriferous and other ores and sands for the extraction of the precious metals therefrom; and it consists in a new and improved furnace for roasting or calcining the ores, the construction and operation of which are hereinafter fully described and claimed.

The furnace is supplied with heat directly from any suitable gas-producer or fireplace. The producer-gas from $g^3$ mingles with the heated air and enters the combustion-chamber of the furnace at $g$, as shown in Figs. 1, 3, and 4, passing between and around the air-superheating tubes $h$ under the lower hopper $i$ in the direction indicated by arrows and up flue $k$ to the first of the series of channels $l$, provided with inclined surfaces $e'$, whence the gases continue their ascent up the flues marked $m\,m\,m\,m\,m$ and through the channels surrounding the furnace, passing out at $n$. Atmospheric air is admitted at $r$, Fig. 1, for the purpose of assisting the oxidizing and sweetening of the material under treatment and admixture with the producer-gas. This air passes down the checkered channels $s\,s\,s$, which act as air-regenerators and surround the flues and a portion of the furnace-chambers. From these channels the air continues its passage through the superheating-tubes $h\,h\,h\,h$ into the furnace-chamber at $t$, whence it rises, alternately impinging upon the revolving dishes and inclined surfaces meeting the material in its descent. From the top of the furnace the air passes down the duct $u$ into the precipitating-box $v$, where the escaping air is deflected upon a cooling-plate $w$, causing the air to lick the surface of water in a tank $y$ used for the reception of float-gold or precipitation of other elements carried in the escaping vapors. The float-gold runs off through pipe $z$, as an overflow, into trough $z'$ leading to amalgamators, the roasted material falling into the same trough down spout $z^2$, where it is met by a jet of water from pipe $z^3$, serving to disintegrate the material. The air in rising through the furnace becomes further superheated by radiation from the inclined surfaces or channels and becomes purified of any noxious vapors or elements by the process above described, being reconveyed through channel $g^2$ to gas-port $g$, where it is again mingled with the producer-gas from $g^3$ and reënters the combustion-chamber $g'$. The operation is then again repeated, the furnace becoming its own air-regenerator.

The operation of this roasting-furnace may be described as follows: The material to be treated is fed into the top of the furnace at $A'$ by means of an automatic feeder $B'$, receiving the material from a mechanical drier. The material falls on the first dish $b'$, which is constructed of fire-clay to resist the high temperatures generated, and is distributed therefrom centrifugally at a speed sufficient to force it onto the circular inclined surface, whence it falls by its own gravity to the next dish, and by this process passing, in rising and falling stages, to the bottom of the furnace and down spout $z^2$ into a trough $z'$, leading to the amalgamators. During the passage of the material through the furnace as described it is met by the rising current of superheated air, and is also subjected during its descent and contact with the inclined circular surfaces to a roasting action produced by the radiated heat generated by the passage of the products of combustion through flues $m$ and circular channels or flues $l$.

Owing to the mechanical process by which the material is passed through this furnace, the regulating control that this action gives, the manner in which the material is presented to and distributed within the furnace, and owing to the arrangement of the passages and the combination of heated currents a maximum effect is economically obtained in the oxidizing and sweetening of the material treated.

At the lower end of the furnace is a conical outlet or hopper $i$, through which the calcined or oxidized material passes directly from the furnace into a water-trough $z'$. This sudden immersion of the incandescent sand causes instant disintegration of the particles and consequent mechanical liberation of the precious metal.

Motion is imparted to the central spindle and dishes of this furnace by means of the pulley $c^2$, which is keyed to the upper end of the spindle $a'$, as shown in Fig. 1.

Having thus described our invention, what we claim, and desire to secure by Letters Patent, is—

1. In the treatment of auriferous and other ores to extract their values, means for roasting or calcining the particles, consisting of a vertically-arranged series of revoluble dishes for imparting a centrifugal action to the particles, a series of hollow rings having inclined surfaces adjacent to and respectively below said dishes, mechanism for feeding the particles to the dishes, means for supplying hot air only in direct contact with the particles, and independent means for circulating products of combustion in and around the rings, whereby the particles are subjected to a roasting or calcining action while in suspension, substantially as described.

2. In the treatment of auriferous and other ores to extract their values, a roasting and calcining furnace having a vertically-arranged series of revoluble dishes for imparting centrifugal action to the particles, a series of rings alternating with said dishes and provided with annular chambers and inclined surfaces, a furnace for circulating heat to the chambered rings whereby the particles are subjected to a roasting and calcining action while in suspension, said furnace having a checker-work air-regenerator and fire-clay tubes within the combustion-chamber for superheating the air and means for supplying the superheated air directly to the particles substantially in the manner and for the purpose set forth.

3. In the treatment of auriferous and other ores to extract their values, a roasting and calcining furnace having a vertically-arranged series of revoluble dishes for imparting a centrifugal action to the particles, a series of chambered rings alternating with said dishes and having inclined surfaces adjacent thereto, a furnace having connection with the chambered rings whereby the heat from the circulating products of combustion is brought by radiation from the inclined surfaces in contact with the particles while in suspension, said furnace having a checker-work air-regenerator, fire-clay tubes within the combustion-chamber by which the air from the regenerator is superheated, a passage leading to the base of the roasting and calcining furnace, by which the superheated air is brought in direct contact in its ascent with the descending particles, and a downtake and precipitating-box in combination with a deflector and water-tank, all substantially as and for the purpose set forth.

4. In the treatment of auriferous and other ores to extract their values the combination with a roasting and calcining furnace in which the particles are subjected to centrifugal action, a furnace to supply heat by radiation to the particles and means for supplying superheated air directly to the particles while in suspension, consisting of a checker-work air-regenerator in combination with fire-clay tubes within the combustion-chamber for superheating the air, a deflector and water-tank for the purpose of cleansing the superheated air and freeing it from float metal or noxious elements and precipitating same in the tank, a gas-port at the entrance to the combustion-chamber and a passage connecting the precipitating-box with the gas-port, for returning the heated air and mingling the same with the gas substantially in the manner and for the purpose set forth.

JOHN WILLIAM HENRY JAMES.
THOMAS ROWLAND JORDAN.

Witnesses:
FRANK FREEMUS,
JOSEPH MCLEAN.